(12) United States Patent
Wenthen

(10) Patent No.: US 8,795,117 B2
(45) Date of Patent: *Aug. 5, 2014

(54) CONTINUOUSLY VARIABLE TRANSMISSIONS FOR MOTOR VEHICLES

(71) Applicant: David W. Wenthen, Rochester Hills, MI (US)

(72) Inventor: David W. Wenthen, Rochester Hills, MI (US)

(73) Assignee: Magna Powertrain USA, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/858,207

(22) Filed: Apr. 8, 2013

(65) Prior Publication Data

US 2013/0225350 A1 Aug. 29, 2013

Related U.S. Application Data

(63) Continuation of application No. 12/766,954, filed on Apr. 26, 2010, now Pat. No. 8,414,438, which is a continuation-in-part of application No. 12/617,031, filed on Nov. 12, 2009.

(51) Int. Cl.
*F16H 3/72* (2006.01)
*F16H 37/06* (2006.01)
*F16H 47/04* (2006.01)
*B60K 6/445* (2007.10)

(52) U.S. Cl.
USPC ............... 475/5; 475/4; 475/83; 180/65.235

(58) Field of Classification Search
USPC .............. 475/1–8, 10, 83; 180/65.1, 65.21, 180/65.235, 65.6, 65.7
See application file for complete search history.

(56) References Cited

U.S. PATENT DOCUMENTS

| | | | |
|---|---|---|---|
| 4,579,019 A | 4/1986 | Gabriele | |
| 4,592,454 A * | 6/1986 | Michel | 192/3.23 |
| 4,964,315 A | 10/1990 | Willis, Jr. | |
| 6,302,227 B1 | 10/2001 | Takemura et al. | |
| 6,524,217 B1 | 2/2003 | Murakami et al. | |
| 6,615,940 B2 | 9/2003 | Morisawa | |
| 6,732,526 B2 | 5/2004 | Minagawa et al. | |
| 7,056,252 B2 | 6/2006 | Gumpoltsberger et al. | |
| 7,223,199 B2 * | 5/2007 | Willmot et al. | 475/339 |
| 7,256,510 B2 | 8/2007 | Holmes et al. | |
| 7,276,008 B2 | 10/2007 | Yasui et al. | |
| 8,376,885 B2 * | 2/2013 | Clauson | 475/5 |
| 2004/0043856 A1 | 3/2004 | Xiaolan | |
| 2010/0261565 A1 | 10/2010 | Ai et al. | |

* cited by examiner

*Primary Examiner* — Tisha Lewis
(74) *Attorney, Agent, or Firm* — Dickinson Wright PLLC

(57) ABSTRACT

A transmission for transferring torque from a prime mover includes a first input shaft adapted to be driven by the prime mover, a second input shaft, an output shaft and an epicyclic gearset. The gearset includes a ring gear being driven by the first input shaft, pinion gears being driven by the ring gear, a sun gear driven by the second input shaft and driving the pinion gears, and a carrier driving the output shaft. A reaction motor drives the second input shaft. A controller controls the reaction motor to vary the speed of the second input shaft and define a gear ratio between the first input shaft and the output shaft based on the second input shaft speed.

24 Claims, 14 Drawing Sheets

CONTINUOUSLY VARIABLE TRANSMISSIONS FOR MOTOR VEHICLES

CROSS-REFERENCE TO RELATED APPLICATIONS

This application is a continuation of U.S. patent application Ser. No. 12/766,954 filed Aug. 26, 2010, now U.S. Pat. No. 8,414,438, which is a continuation-in-part of U.S. patent Ser. No. 12/617,031 filed on Nov. 12, 2009, now U.S. Pat. No. 8,517,875.

FIELD

The present disclosure relates to power transmission devices. More particularly, a transmission for transferring torque at a variable speed reduction ratio includes a planetary gear drive driven by two sources of power.

BACKGROUND

Geared transmissions typically function to change the rotational speed of a prime mover output shaft and an input shaft of a desired work output. In a vehicle, the prime mover may include a diesel or gasoline internal combustion engine. It should be noted that there are many more applications than automobiles and trucks. Locomotives are equipped with transmissions between their engines and their wheels. Bicycles and motorcycles also include a transmission. Speed-increasing transmissions allow the large, slow-moving blades of a windmill to generate power much closer to a desired AC frequency. Other industrial applications exist. In each case, the motor and transmission act together to provide power at a desired speed and torque to do useful work. Geared transmissions have also been used in combination with electric motors acting as the prime mover.

Multiple speed transmissions have been coupled to high torque prime movers that typically operate within a narrow speed range, most notably structured as large displacement diesel engines of tractor trailers. Electric motors have a much wider speed range in which they operate effectively. However, the motor operates most efficiently at a single speed. Known multiple speed transmissions attempt to maintain an optimum operating speed and torque of the prime mover output shaft, but only approach this condition due to the discrete gear ratios provided. Accordingly, a need for a simplified variable speed ratio power transmission device exists.

Many existing transmissions incorporate planetary gearsets within the torque path. A traditional planetary gear drive has three major components: a sun gear, an annulus ring gear and a planet carrier. When one of those components is connected to the prime mover, another is used as the output and the third component is not allowed to rotate, the input and output rotate at different speeds, and may also rotate in opposite directions, with the ratio of input to output speeds being a fixed value. If the previously fixed third component is connected to a second input and forced to rotate, the transmission will have a continuously varying speed ratio dependent on the speeds of both the prime mover and this new second input. One example of such a planetary gear drive is made by Toyota. While planetary gearsets have been successfully used in vehicle power transmissions in the past, a need exists for a planetary drive and control system for optimizing the gear drive's efficiency and power density.

SUMMARY

This section provides a general summary of the disclosure, and is not a comprehensive disclosure of its full scope or all of its features.

A transmission for transferring torque from a prime mover includes a first input shaft adapted to be driven by the prime mover, a second input shaft and an output shaft. A compound planetary gearset includes a sun gear driven by the first input shaft, first pinion gears being driven by the sun gear, a ring gear fixed for rotation with the second input shaft and being meshed with second pinion gears, and a carrier driving the output shaft. A reaction motor drives the second input shaft. A controller controls the reaction motor to vary the speed of the second input shaft and define a gear ratio between the first input shaft and the output shaft based on the second input shaft speed.

A transmission for transferring torque from a prime mover includes a first input shaft adapted to be driven by the prime mover, a second input shaft, an output shaft and an epicyclic gearset. The gearset includes a ring gear being driven by the first input shaft, pinion gears being driven by the ring gear, a sun gear driven by the second input shaft and driving the pinion gears, and a carrier driving the output shaft. A reaction motor drives the second input shaft. A controller controls the reaction motor to vary the speed of the second input shaft and define a gear ratio between the first input shaft and the output shaft based on the second input shaft speed.

A transmission includes a first input shaft adapted to be driven by the prime mover, a second input shaft, an output shaft, and an epicyclic gearset. The gearset includes a sun gear being driven by the first input shaft, pinion gears in meshed engagement with the sun gear, a carrier driven by the second input shaft and rotatably supporting the pinion gears, and a ring gear fixed for rotation with the output shaft. A reaction motor drives the second input shaft. A controller controls the reaction motor to vary the speed of the second input shaft and define a gear ratio between the first input and the output shaft based on the a second input shaft speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure is directed to a transmission that can be adaptively controlled to transfer torque between a first rotary member and a second rotary member. The transmission finds particular application in motor vehicle drivelines such as, for example, a continuously variable torque transfer mechanism. Thus, while the transmission of the present disclosure is hereinafter described in association with particular arrangements for use in specific driveline applications, it will be understood that the arrangements shown and described are merely intended to illustrate embodiments of the present disclosure.

Figure 1:
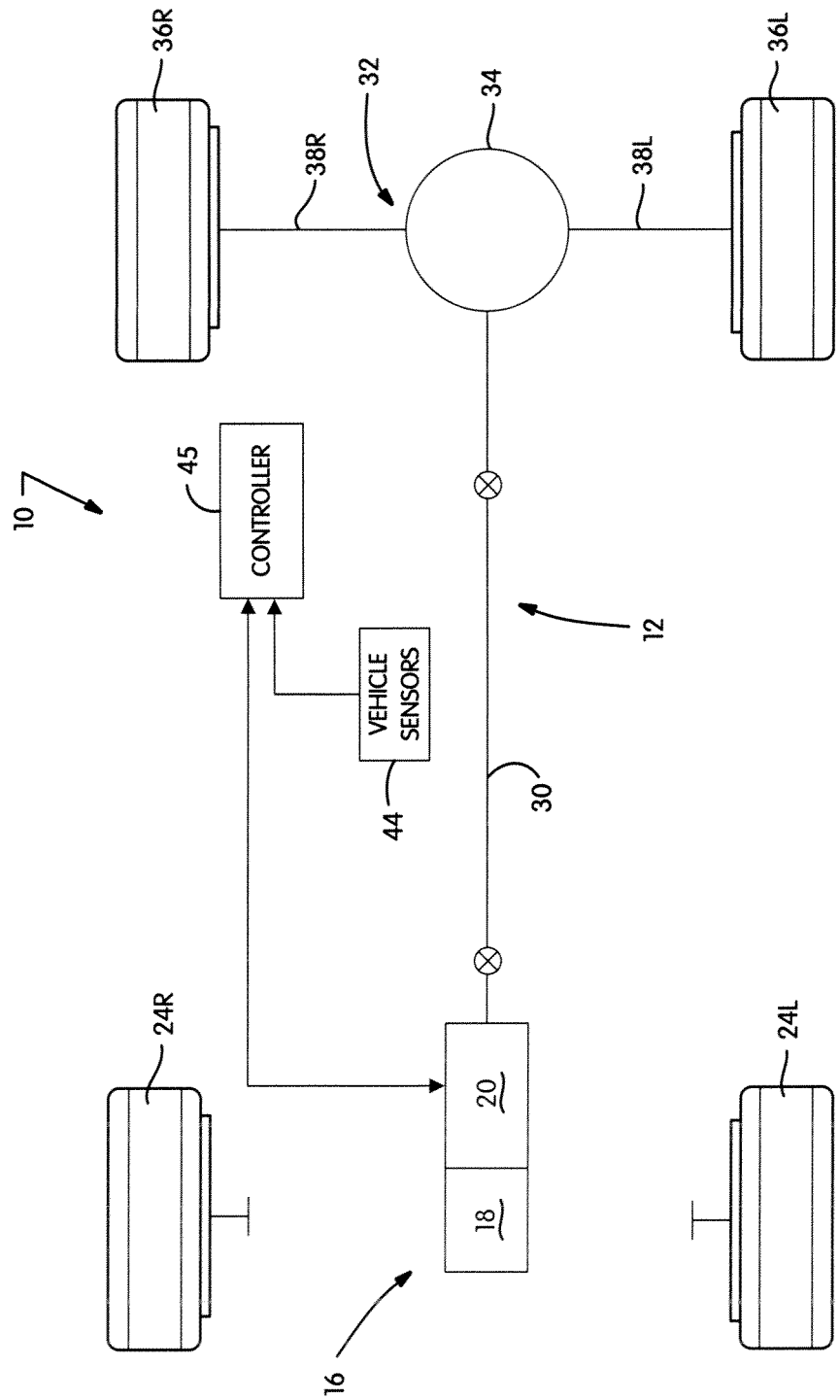
FIG. 1 is a schematic depicting an exemplary vehicle equipped with a transmission constructed in accordance with the teachings of the present disclosure.

With particular reference to FIG. 1 of the drawings, a drivetrain 10 for an all-wheel drive vehicle is shown. Drivetrain 10 includes a driveline 12 and a powertrain 16 for delivering rotary tractive power (i.e., drive torque) to the driveline. In the particular arrangement shown, driveline 12 is the rear driveline. Powertrain 16 is shown to include an engine 18 and a transmission 20. A pair of front wheels 24L and 24R are not driven. Driveline 12 includes a propshaft 30 driven by transmission 20 and a rear axle assembly 32 for transferring drive torque from engine 18 to a rear differential 34. A pair of rear axleshafts 38L and 38R interconnect rear differential 34 to corresponding rear wheels 36L and 36R.

Figure 2:
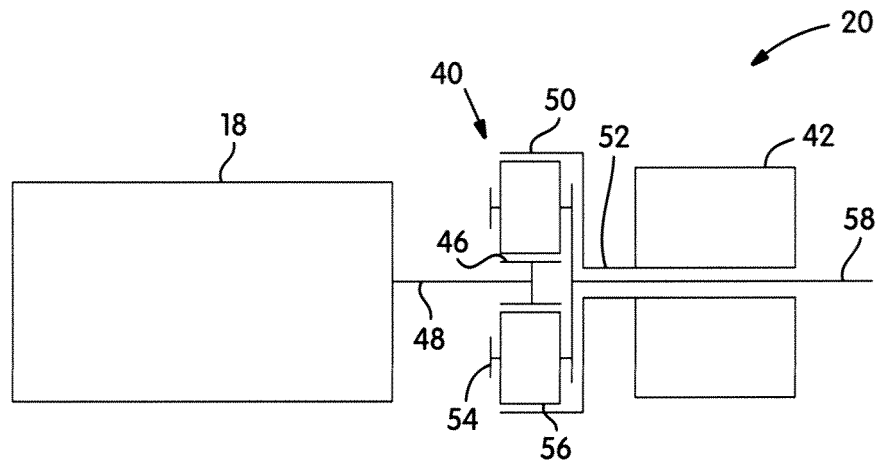
FIG. 2 is a schematic representation of a transmission having a simple planetary gearset.

As shown in FIGS. 1 and 2, transmission 20 includes a planetary gearset 40 and a reaction motor 42. Drivetrain 10 is shown to further include vehicle sensors 44 for detecting certain dynamic and operational characteristics of the motor vehicle and a controller 45 for controlling actuation of reaction motor 42 in response to input signals from vehicle sensors 44.

Planetary gearset 40 includes a sun gear 46 fixed for rotation with an output shaft 48 of engine 18. An annulus ring gear 50 is fixed for rotation with an output shaft 52 of reaction motor 42. Planetary gearset 40 also includes a carrier 54 rotatably supporting a plurality of pinion gears 56 that are each in constant meshed engagement with annulus ring gear 50 and sun gear 46. An output shaft 58 is fixed for rotation with carrier 54. The remainder of this disclosure discusses how the sun gear speed $\omega_S$ to carrier speed $\omega_C$ ratio is a function of an annulus ring gear speed $\omega_R$ to sun speed $\omega_S$ ratio in simple and compound planetary gearsets and how the asymptotic nature of this speed ratio may be exploited to improve the gear drive's efficiency and power density.

If a positive direction of annulus ring rotation is defined to be in the same direction as that of the sun gear and carrier assembly, it can be shown that in the general case, the ratio of sun to carrier speeds is given by:

$$\frac{\omega_S}{\omega_C} = \frac{z_S + z_R}{z_S}\left[1 - \left(\frac{\omega_R z_R}{\omega_S z_S + \omega_R z_R}\right)\right] \quad (1)$$

where $\omega_S$, $\omega_C$, and $\omega_R$ are the sun, carrier and annulus ring angular velocities and $z_R$ and $Z_S$ are the number of teeth in the annulus ring and sun gears, respectively. Note that if $\omega_R=0$, equation (1) simplifies to the familiar relationship between sun and carrier speeds for a fixed annulus ring.

We define the ratio of ring speed to sun speed as $$\omega_{R/S} = \frac{\omega_R}{\omega_S} \quad (2)$$

Equation (1) may then be rewritten as $$\frac{\omega_S}{\omega_C} = \frac{Z_R + Z_S}{Z_S + \omega_{R/S} \cdot Z_R} \quad (3)$$

Figure 3:
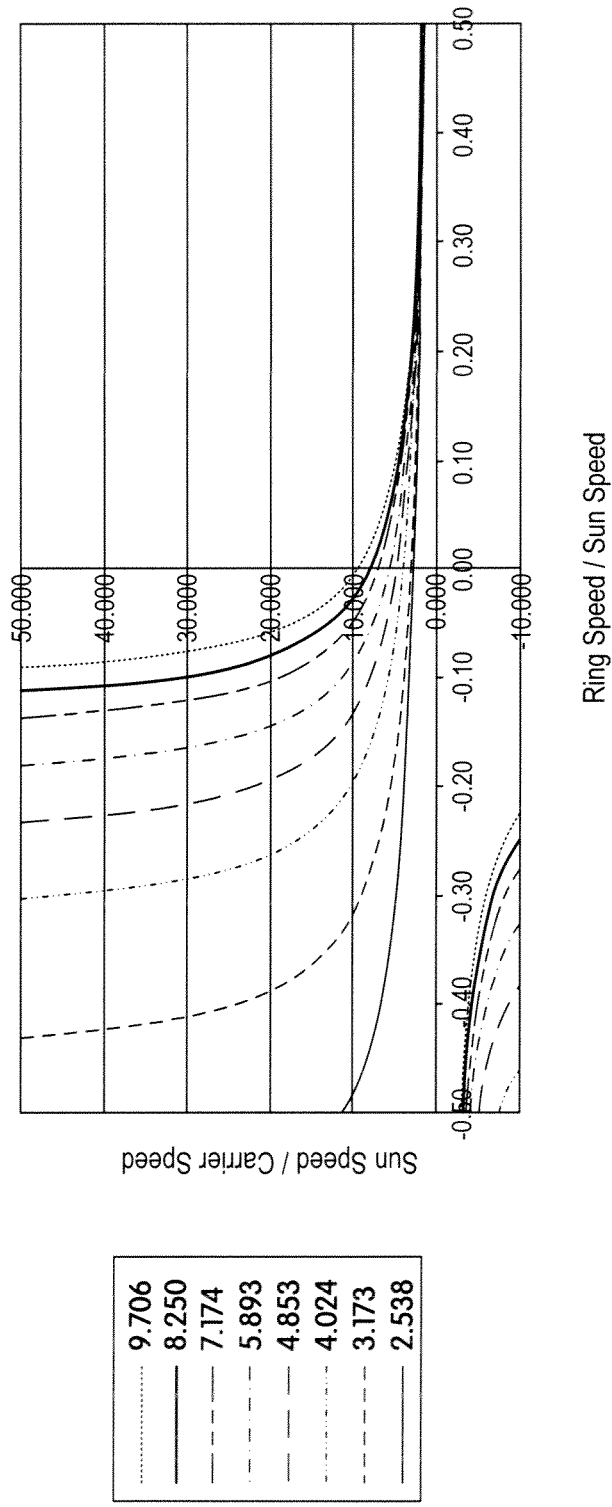
FIG. 3 is a graph depicting sun speed to carrier speed ratio versus ring speed to sun speed ratio for a number of fixed ring ratios of a simple planetary gearset.

It can be noted that there will be a value of $\omega_{R/S}$ for which $\omega_S/\omega_C$ will become asymptotic. FIG. 3 shows equation (3) plotted against the ring to sun speed ratio for different numbers of ring and sun gear teeth. Each curve is labeled with its carrier to sun fixed ring ratio (FRR). Table 1 lists the number of teeth in the sun, planets and ring of each planetary combination, as well as each tooth combination's FRR. The combinations of sun, planet and ring gear tooth numbers were selected to span the practical limits of geometry constraints.

FIG. 3 plots the speed ratio $\omega_S/\omega_C$ against $\omega_{R/S}$ for various FRR values listed in Table 1 and shows that the vertical asymptote increases from $\omega_{R/S}=-0.650$ to $-0.115$ as the FRR increases. More importantly, the magnitude of the $\omega_S/\omega_C$ slope as the curve crosses the ordinate axis $\omega_{R/S}=0$ increases as well. As the magnitude of the $\omega_S/\omega_C$ slope increases, the annulus ring speed required to effect a change in the speed ratio $\omega_S/\omega_C$ decreases dramatically. The annulus ring gear 50, however, is the largest of all component gears in the planetary gearset 40. As such, a relatively large torque may need to be reacted by reaction motor 42. The torque necessary to supply a sufficient reaction to pinion gears 56 may be quite large as well.

The sensitivity of the speed ratio to its fixed ring ratio is quantified by defining the ratio of the highest to lowest speed ratios as Δ for an arbitrary value of $\omega_{R/S}$ selected as +/−10% of the sun's speed, as well as the value of $\omega_{R/S}$ for the vertical asymptote. Table 1 presents this data.

TABLE 1

Simple Planetary Tooth Combinations

| Numbers of Teeth | | | Fixed Ring | Ratio Spread $\Delta = (\omega_S/\omega_C)_{MAX}/ (\omega_S/\omega_C)_{MIN}$ $-0.1 < \omega_{R/S} < 0.1$ | Vertical Asypmptote $\omega_{R/S} = \omega_R/\omega_S$ |
| --- | --- | --- | --- | --- | --- |
| Sun $Z_S$ | Planets $Z_P$ | Ring $Z_R$ | Speed Ratio $(Z_S + Z_R)/Z_S$ | | |
| 17 | 65 | 148 | 9.706 | 14.455 | −0.115 |
| 20 | 62 | 145 | 8.250 | 6.273 | −0.138 |
| 23 | 59 | 142 | 7.174 | 4.227 | −0.162 |
| 28 | 54 | 137 | 5.893 | 2.916 | −0.204 |
| 34 | 48 | 131 | 4.853 | 2.254 | −0.260 |
| 41 | 41 | 124 | 4.024 | 1.867 | −0.331 |
| 52 | 30 | 113 | 3.173 | 1.555 | −0.460 |
| 65 | 17 | 100 | 2.538 | 1.364 | −0.650 |

Figure 4:
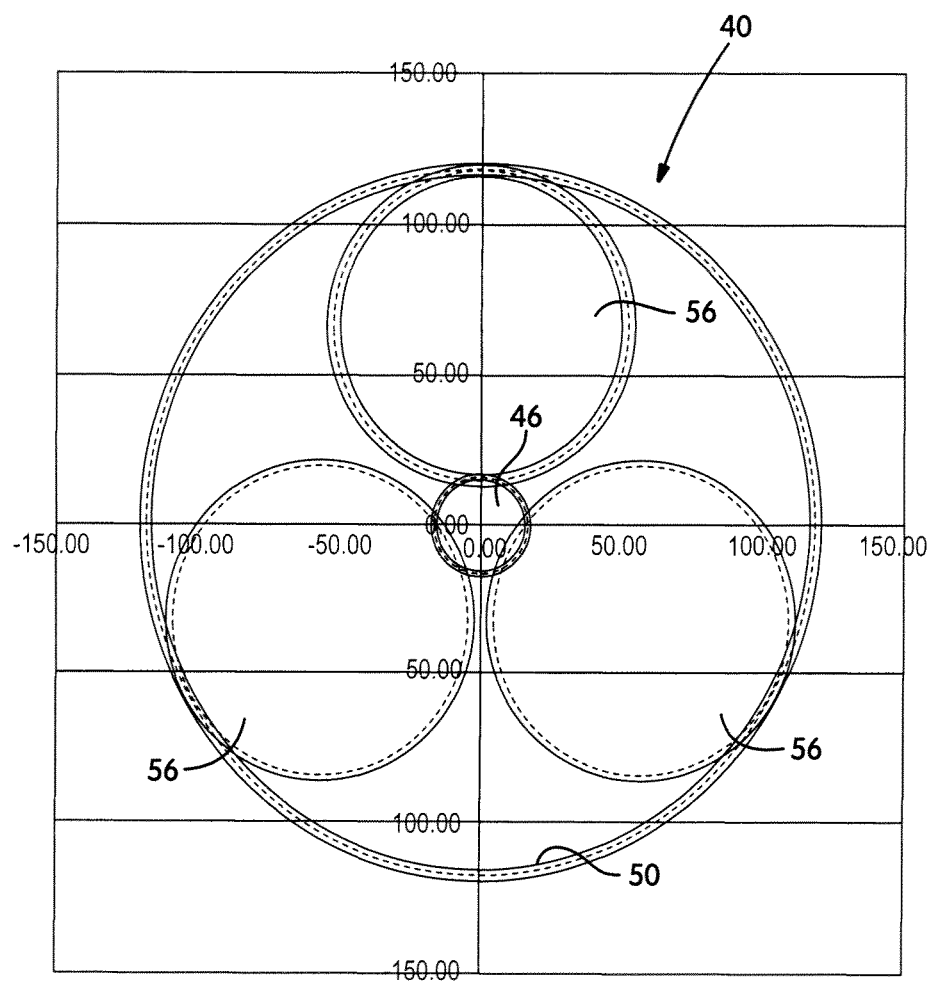
FIG. 4 depicts relative diameters of sun, planet and annulus ring gears for a planetary gearset having a fixed ring ratio of 9.706.

Table 1 and FIG. 3 illustrate that a large fixed ring ratio (FRR) is necessary to have the desirable feature of $\omega_S/\omega_C$ speed ratio sensitivity. Design constraints may exist where such a large FRR is not practical. FIG. 4 shows the relative diameters of the sun, planets and annulus ring of the 9.706 FRR planetary. The relatively small sun size will limit the strength of the shaft on which the sun gear is fixed. Furthermore, just as there is a minimum practical FRR, below which the planet pinions are too small to be supported with rolling element bearings, there is a maximum FRR, above which the tips of the planet pinions will interfere.

Figure 5:
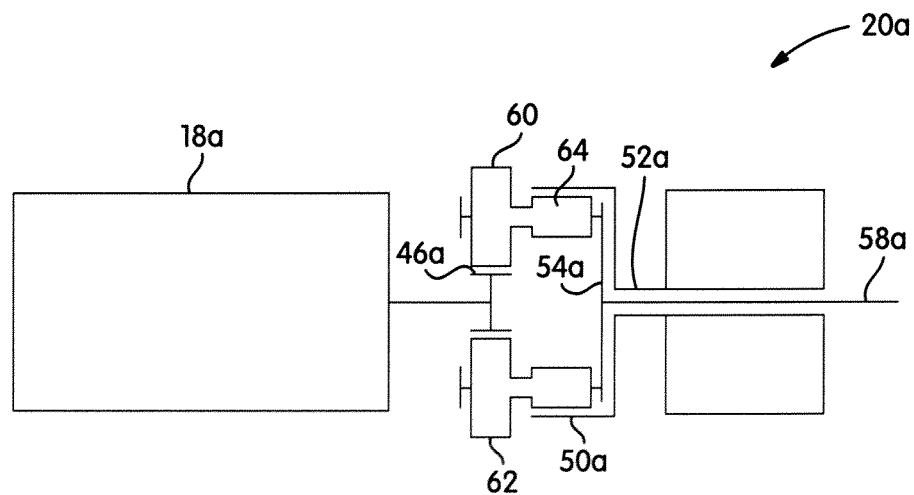
FIG. 5 is a schematic depicting a transmission equipped with a compound planetary gearset.

FIG. 5 depicts an alternative transmission 20a having a compound planetary gearset 40a in lieu of simple planetary gearset 40. Alternative transmission 20a is substantially similar to transmission 20. Accordingly, like elements will be identified with reference numerals including an "a" suffix. Planetary gearset 40a differs from simple planetary gearset 40 in that compound pinion gears 60 replace pinion gears 56. Each compound pinion gear 60 includes a first pinion gear 62 in meshed engagement with sun gear 46a as well as a reduced diameter second pinion gear 64 in constant meshed engagement with annulus ring gear 50a. First pinion gears 62 have a predetermined number of teeth, module, pressure angle and helix angle based on the mesh with sun gear 46a. Second pinion gears 64 have a reduced number of teeth, a different module, pressure angle and helix angle for the gear meshes with annulus ring gear 50a. The compound planetary gearset provides a minimized inner and outer radial packaging. Furthermore, the compound planetary gearset provides a greater reduction gear ratio. It should be appreciated that first pinion gears 62 and second pinion gears 64 are aligned in pairs to rotate on common pinion centers.

To operate on the same pinion centers, the module, helix angle and number of teeth must satisfy this constraint:

$$\frac{m_R \cos\beta_S}{m_S \cos\beta_R} = \frac{z_S + z_{PS}}{z_R - z_{PR}} \quad (4)$$

where $m_R$ and $m_S$ are the normal modules of the ring and sun meshes, respectively. The planet pinions $Z_{PS}$ and $Z_{PR}$ mesh with the sun and annulus, respectively. In addition to the geometry constraint of equation (4), each of the compound planet pinions independent meshes must have the same torque, but because each torque will act at different pitch geometries, the tooth loads may differ significantly and require largely different modules as a result.

If the design of a compound planetary gear set is modified to allow for an annulus gear that may move at a controlled angular speed while still providing the necessary reaction torque for the planet pinions, a similar asymptotic behavior to that seen in FIG. 3 exists. With the same reasoning used to develop equations (1) and (2), it can be shown that the speed ratio $\omega_S/\omega_C$ of a compound planetary gear set, in which the annulus gear is allowed to rotate is given by:

$$\frac{\omega_S}{\omega_C} = \frac{z_R \cdot z_{PS} + z_S \cdot z_{PR}}{z_S \cdot z_{PR} + \omega_{R/S} \cdot z_R \cdot z_{PS}} \quad (5)$$

Figure 6:
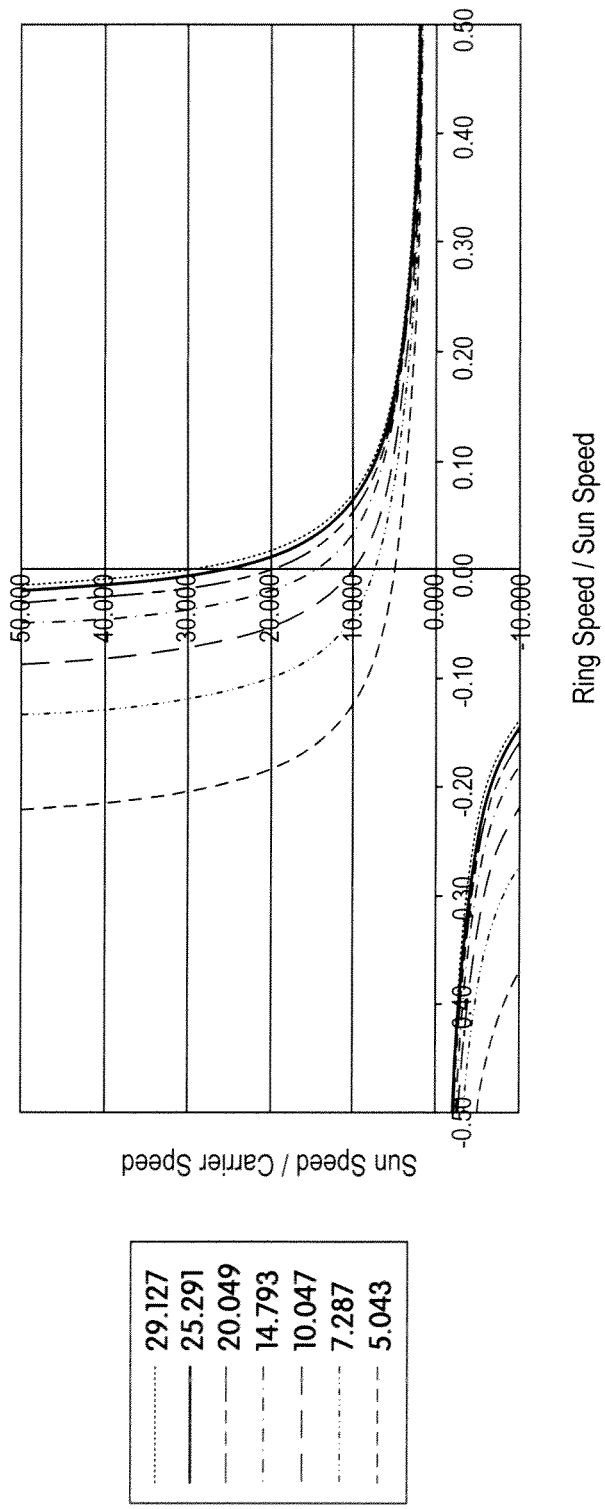
FIG. 6 is a graph depicting sun speed to carrier speed ratio versus ring speed to sun speed ratio for a number of compound planetary gearsets.

As with equations (1) and (2), equation (5) reduces to the familiar speed relationship for a fixed annulus ring when $\omega_{R/S}=0$. Since a compound planetary gear set is capable for a larger speed ratio $\omega_S/\omega_C$, the benefits of the asymptotic nature of equation (5) can be more fully exploited. FIG. 6 shows the sun-carrier speed ratios again plotted against ring-sun speed ratios for different fixed ring ratios.

TABLE 2

Compound Planetary Tooth Combinations

| Numbers of Teeth | | | | Fixed Ring | Ratio Spread |
| --- | --- | --- | --- | --- | --- |
| Sun $Z_S$ | Planets (Sun) $Z_{PS}$ | Planets (Ring) $Z_{PR}$ | Ring $Z_R$ | Speed Ratio $(Z_S Z_{PR} + Z_R Z_{PS})/ (Z_S Z_{PR})$ | $\Delta = (\omega_S/\omega_C)_{MAX}/ (\omega_S/\omega_C)_{MIN}$ $-0.03 < \omega_{R/S} < 0.03$ |
| 19 | 79 | 17 | 115 | 29.127 | 11.805 |
| 22 | 79 | 17 | 115 | 25.291 | 6.373 |
| 23 | 76 | 17 | 98 | 20.049 | 3.667 |
| 29 | 68 | 17 | 100 | 14.793 | 2.412 |
| 35 | 64 | 19 | 94 | 10.047 | 1.745 |
| 37 | 50 | 23 | 107 | 7.287 | 1.465 |
| 47 | 46 | 23 | 95 | 5.043 | 1.276 |

As was done for simple planetary gear drives, tooth combinations shown in Table 2 were selected to attempt to span the practical FRR limits. A FRR less than 5.043 would most likely not justify the additional complexity and expense of a compound planetary over a simple planetary and a FRR larger than 30 may not be practical, as can be seen from FIG. 6. It is also noted that in comparing FIGS. 3 and 6, it can be seen for a given FRR a compound planetary will have a larger asymptote value than a simple planetary.

Figure 7:
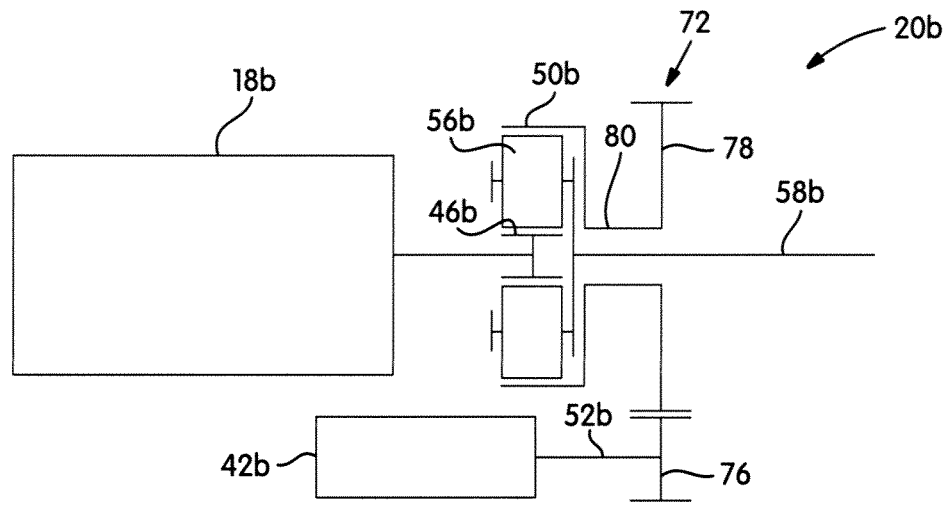
FIG. 7 is a schematic of an alternate transmission including a simple planetary gearset and an offset motor and speed reduction unit.

FIG. 7 depicts an alternate transmission 20b and is constructed substantially similarly to transmission 20. Similar elements will be identified with like reference numerals including a "b" suffix. A reaction motor 42b includes an output shaft 52b that extends offset and parallel to an axis of rotation of output shaft 58b. Reaction motor 42b drives a reduction gearset 72 to rotate ring gear 50b. Reduction gearset 72 includes a first gear 76 fixed for rotation with output shaft 52b. A second gear 78 is in constant meshed engagement with first gear 76 and is fixed for rotation with a concentric shaft 80. Annulus ring gear 50b is also fixed for rotation with concentric shaft 80.

Figure 8:
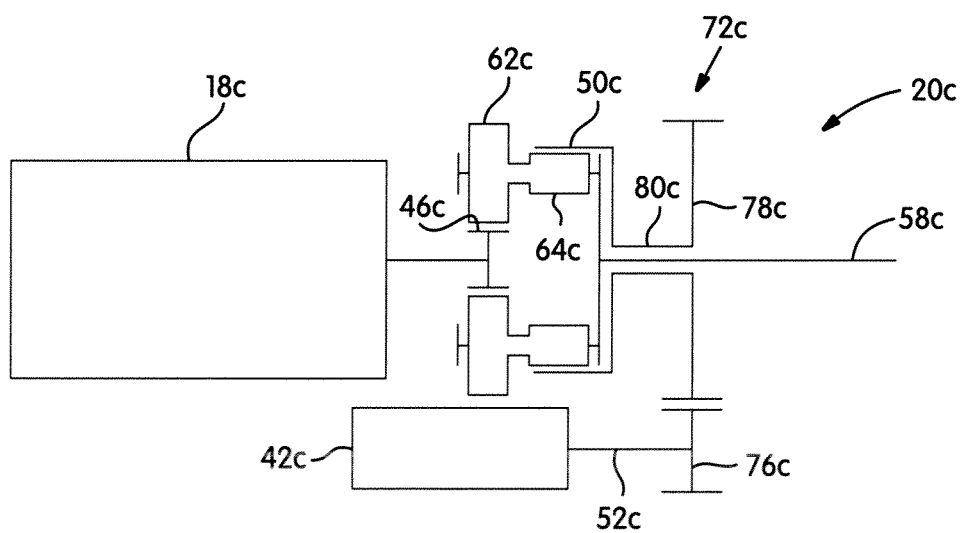
FIG. 8 is a schematic depicting another transmission having a compound planetary gearset driven by an offset reaction motor and speed reduction unit.

FIG. 8 depicts an alternate transmission identified at reference numeral 20c. Transmission 20c includes the offset motor and speed reduction unit arrangement shown in FIG. 7 being used in conjunction with the compound planetary gearset first described at FIG. 5. Accordingly, similar elements will be identified with like reference numerals including a "c" suffix. In operation, reaction motor 42c drives first gear 76c and second gear 78c to rotate annulus ring gear 50c and vary the output ratio provided to output shaft 58c.

Figure 9:
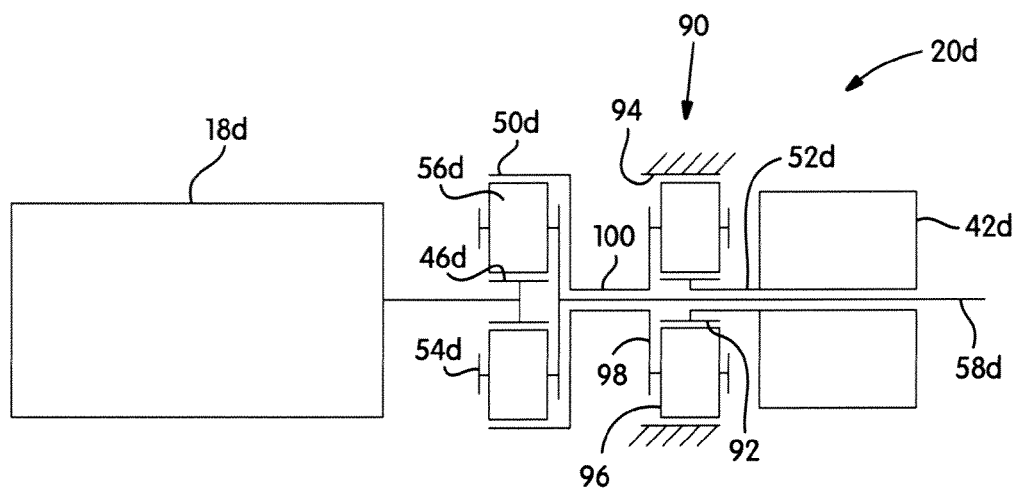
FIG. 9 is a schematic of another transmission including two simple planetary gearsets.

FIG. 9 depicts another alternate transmission identified at reference numeral 20d. Transmission 20d is substantially similar to transmission 20 with the addition of a planetary reduction gearset 90. Similar elements will be identified with like reference numerals having a "d" suffix. Planetary gearset 90 includes a sun gear 92 fixed for rotation with reaction motor output shaft 52d. Reaction motor output shaft 52d is concentrically aligned with and circumscribes output shaft 58d. A ring gear 94 is restricted from rotation. A plurality of pinion gears 96 are supported for rotation on a carrier 98. Pinion gears 96 are each meshed with sun gear 92 and ring gear 94. Carrier 98 is fixed for rotation with a concentric shaft 100. Annulus ring gear 50d is also fixed for rotation with concentric shaft 100.

Figure 10:
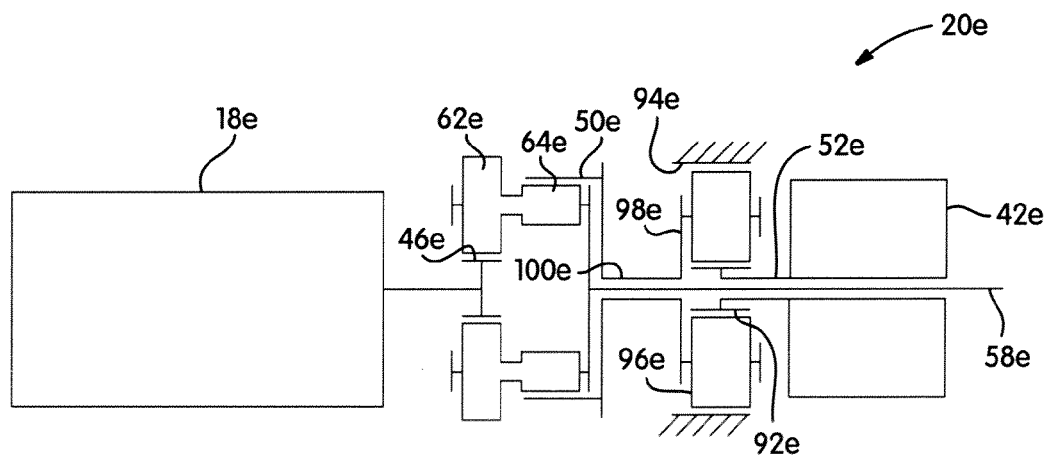
FIG. 10 is a schematic of another transmission equipped with a compound planetary gearset and a simple planetary reduction gearset.

FIG. 10 depicts another alternate transmission 20e that incorporates the planetary reduction gearset of FIG. 9 and mates it with the compound planetary gear arrangement shown in FIG. 5. Similar elements will be identified with like reference numerals having a "e" suffix. Reaction motor 42e includes an output shaft 52e transferring torque to planetary reduction unit 90e. Carrier 98e is fixed for rotation with concentric shaft 100e and annulus ring gear 50e.

Figure 11:
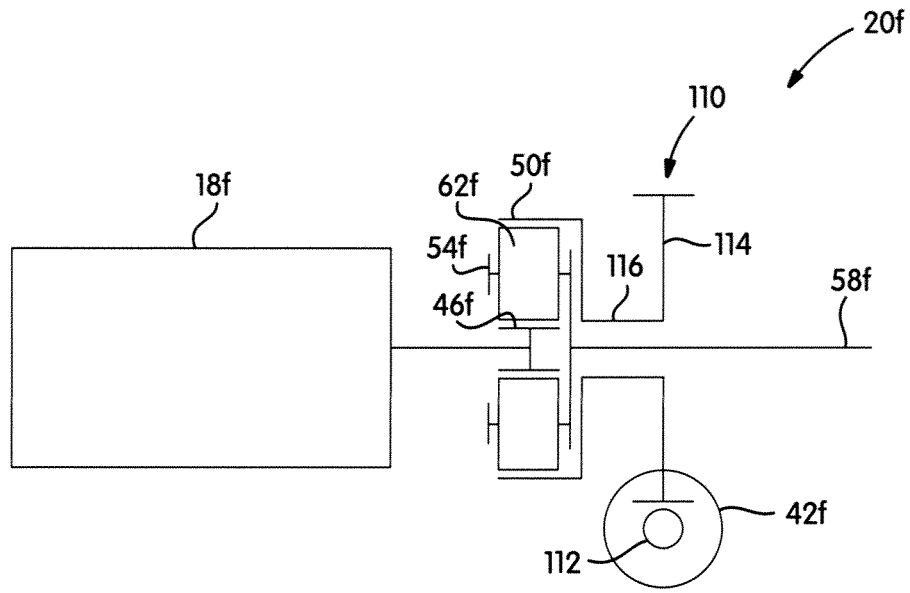
FIGS. 11 and 12 depict alternate transmissions including worm and worm wheel drives.
Figure 12:
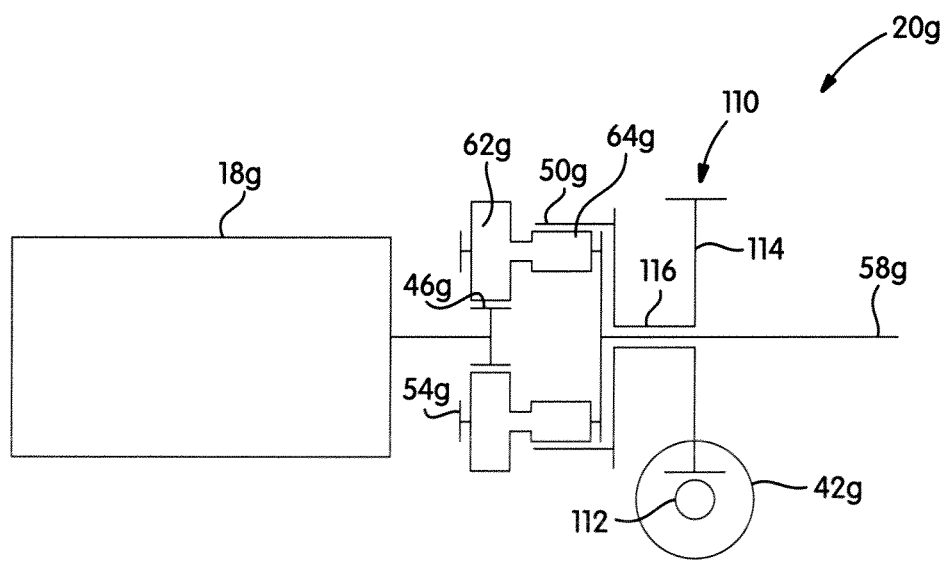

FIGS. 11 and 12 depict alternate transmissions 20f and 20g, respectively. Each of transmissions 20f, 20g include a worm drive 110 including a reaction motor 42f, 42g, driving a worm gear 112 along an axis of rotation that extends substantially perpendicular to an axis of rotation of output shaft 58f, 58g. Worm gear 112 is in constant meshed engagement with a worm wheel 114. Worm wheel 114 is fixed for rotation with a concentric shaft 116. In FIG. 11, concentric shaft 116 is fixed for rotation with annulus ring gear 50f. In similar fashion, concentric shaft 116 of FIG. 12 is fixed for rotation with annulus ring gear 50g.

Figure 13:
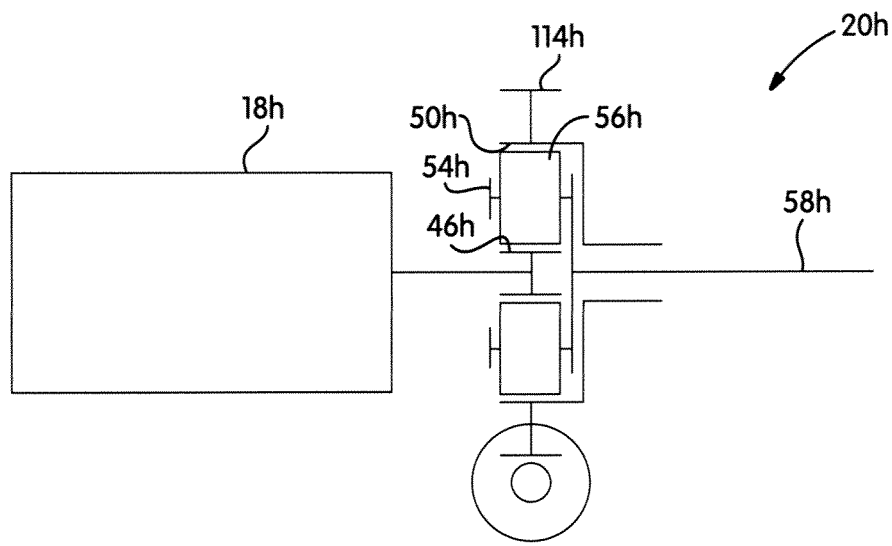
FIGS. 13 and 14 depict alternative transmissions including concentrically arranged worm drive mechanisms.
Figure 14:
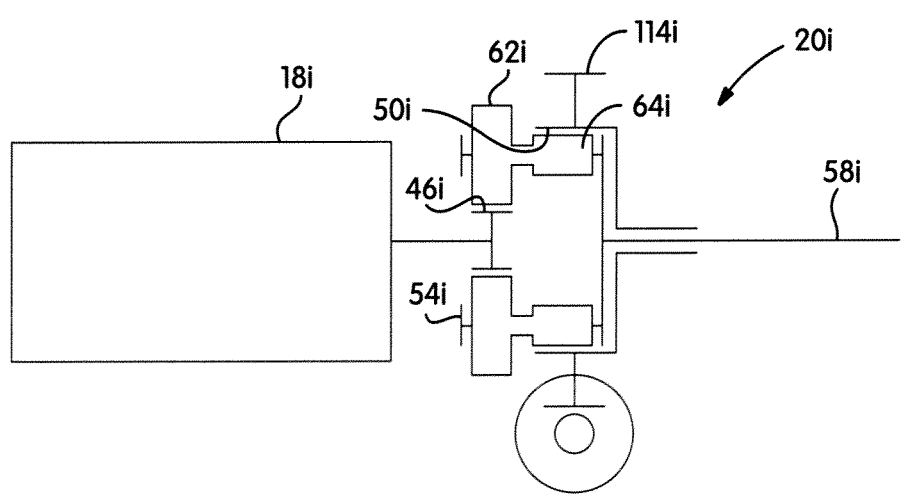

FIGS. 13 and 14 also depict alternative transmissions identified at reference numerals 20h and 20i, respectively. FIGS. 13 and 14 are substantially similar to FIGS. 11 and 12 except that worm wheels 114h, 114i concentrically surround annular ring gears 50h and 50i.

Figure 15:
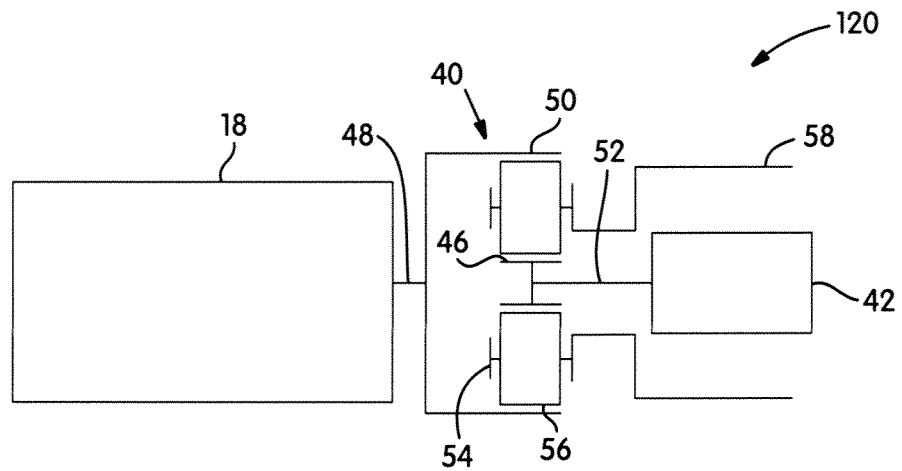
FIG. 15 is a schematic representation of a transmission having a simple solar epicyclic gearset.

FIG. 15 depicts a solar epicyclic gear arrangement 120 defined by sun gear 46, annulus ring gear 50, carrier 54, pinion gears 56 and reaction motor 42 when output shaft 52 of reaction motor 42 is fixed for rotation with sun gear 46. Engine 18 acts as the prime mover supplying torque to driveline 12. Output shaft 58 is fixed to carrier 54. Since the reaction member of a solar arrangement is sun gear 46, we define the sun gear's speed in terms of annulus ring gear 50:

$$\omega_S = \omega_{S/R} \cdot \omega_R \quad (6)$$

The input to output speed ratio u may be expressed as:

$$u = \frac{\omega_R}{\omega_C} = \frac{z_S + z_R}{z_R + \omega_{S/R} \cdot z_S} \quad (7)$$

Figure 16:
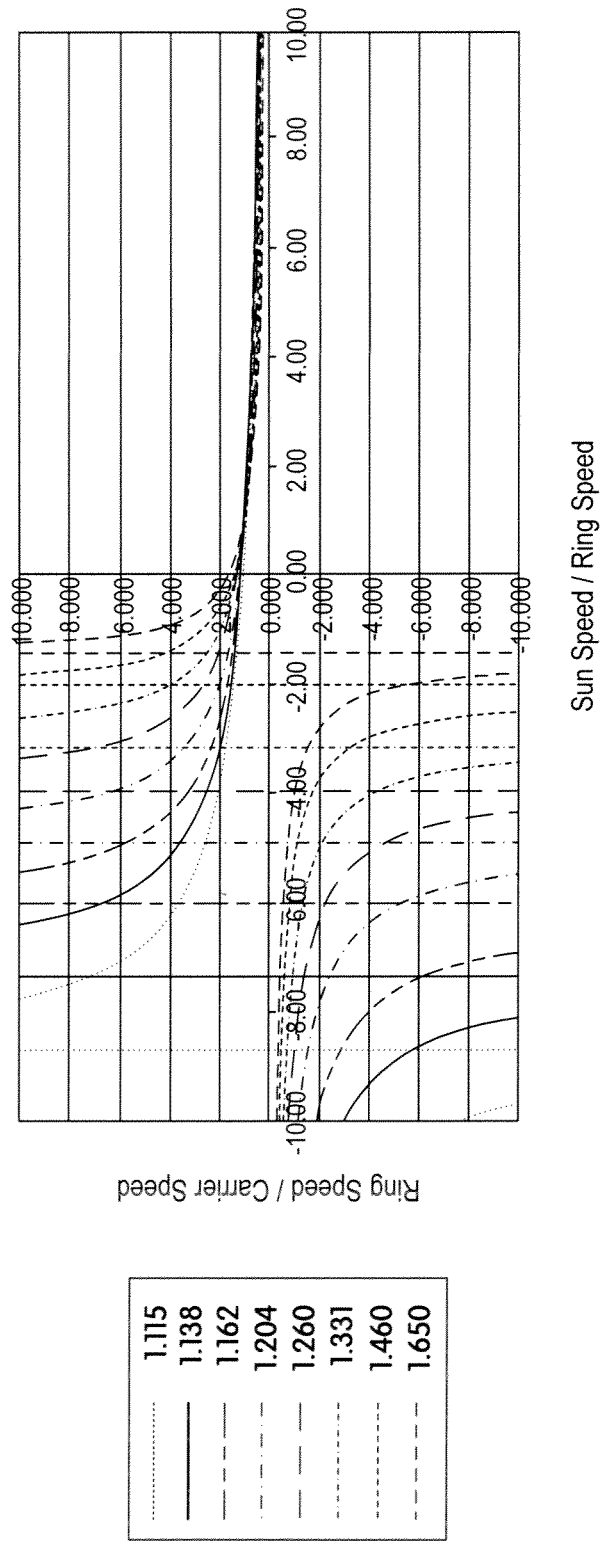
FIG. 16 is a graph depicting ring speed to carrier speed ratio versus sun speed to ring speed ratio for a number of fixed sun speed ratios of a simple solar epicyclic gearset.

At FIG. 16, we plot the above equation for the same sun, planet and annulus ring tooth combinations in an attempt to span the limits of practicality. For simplicity, the same sun, planet and ring tooth combinations used for planetary arrangements are used again for solar arrangements. Note that both the scale and the fixed ring ratios (shown at left) have been updated to agree with the above equation, but the general asymptotic nature is the same as FIG. 3. However, the sun-to-ring speed ratios at which the vertical asymptotes exist are observed to occur at different values. FIG. 16 plots the ratio of ring gear speed ($\omega_R$) to carrier speed ($\omega_C$) against the ratio of sun gear speed ($\omega_S$) to ring gear speed ($\omega_R$) for the solar epicyclic gearset at eight (8) different fixed sun speed ratios ranging from 1.115 to 1.650 which are listed to the left of the plot, in the same manner that FIG. 3 plots the ratio of sun gear speed ($\omega_S$) to carrier speed ($\omega_C$) against the ratio of ring gear speed ($\omega_R$) to sun gear speed ($\omega_S$) for the simple planetary gearset at eight (8) different fixed ring ratios which are listed in Table 1 and to the left of the plot. The plot of FIG. 16 discloses that the vertical asymptote of the ratio of ring gear speed ($\omega_R$) to carrier speed ($\omega_C$) versus the ratio of sun gear speed ($\omega_S$) to ring gear speed ($\omega_R$) for the solar epicyclic gearset ranges between about –1 and –10, in the same manner that FIG. 3 discloses that the vertical asymptote of the ratio of sun gear speed ($\omega_S$) to carrier speed ($\omega_C$) versus a ratio of ring gear speed ($\omega_R$) to sun gear speed ($\omega_S$) for the simple planetary gearset ranges between –0.650 and –0.115.

As was with planetary gearset 40, the power and steady-state torque into the gear drive must balance that exiting the gear drive.

$$\tau_R + \tau_S = \tau_C \quad (8)$$

$$\tau_R \cdot \omega_R + \tau_S \cdot \omega_S = \tau_C \cdot \omega_C \quad (9)$$

As before, we make the kinematics and steady-state torque substitutions into the power balance equation, and obtain the carrier and sun torques in terms of the ring torque.

$$\frac{\tau_C}{\tau_R} = \frac{z_S + z_R}{z_R} \quad (10)$$

$$\frac{\tau_S}{\tau_R} = \frac{z_S}{z_R} \quad (11)$$

As was done in the previous section with planetary gearset 40, we again define the ratio of the reaction power to the input power as K, and write that for the solar arrangement variable speed ratio, $$u = \frac{z_S + z_R}{z_R + \omega_{S/R} \cdot z_S} = \frac{z_S + z_R}{z_R(1 + \kappa)} \quad (12)$$

The same relationship for transmission ratio spread as was discussed earlier exists as well. Therefore, for both a planetary and solar epicyclic arrangement, the kinematics exhibits an asymptotic behavior. However, the speeds of the reaction member at which the asymptote is observed will depend on the type of epicyclic arrangement, as well as the fixed reaction member speed ratios. In both cases, the transmission ratio spread required for the application will define the power requirements of the reaction motor/generator.

Figure 17:
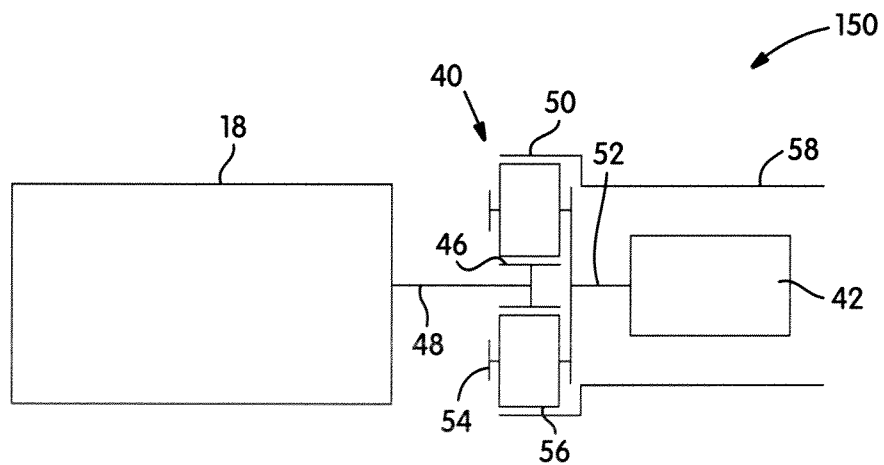
FIG. 17 is a schematic representation of a transmission having a simple star epicyclic gearset.

Another alternate transmission is shown in FIG. 17 and identified as a star epicyclic gear arrangement having each of sun gear 46, annulus ring gear 50, carrier 54, pinion gears 56 and reaction motor 42. Prime mover or engine 18 drives sun gear 46. Reaction motor 42 drives carrier 54. Output shaft 58 is fixed to annulus ring gear 50. As with the planetary and solar epicyclic gear drives, we define the reaction member's speed in terms of the input's. For a star gear drive, the reaction member is the carrier.

$$\omega_C = \omega_{C/S} \cdot \omega_S \quad (13)$$

If we follow the same steps as we did for the planetary and solar epicyclic gear drives, we can rearrange the equation to give us the sun to ring speed ratio.

$$u = \frac{\omega_S}{\omega_R} = \frac{-z_R}{z_S - \omega_{C/S} \cdot (z_S + z_R)} \quad (14)$$

Figure 18:
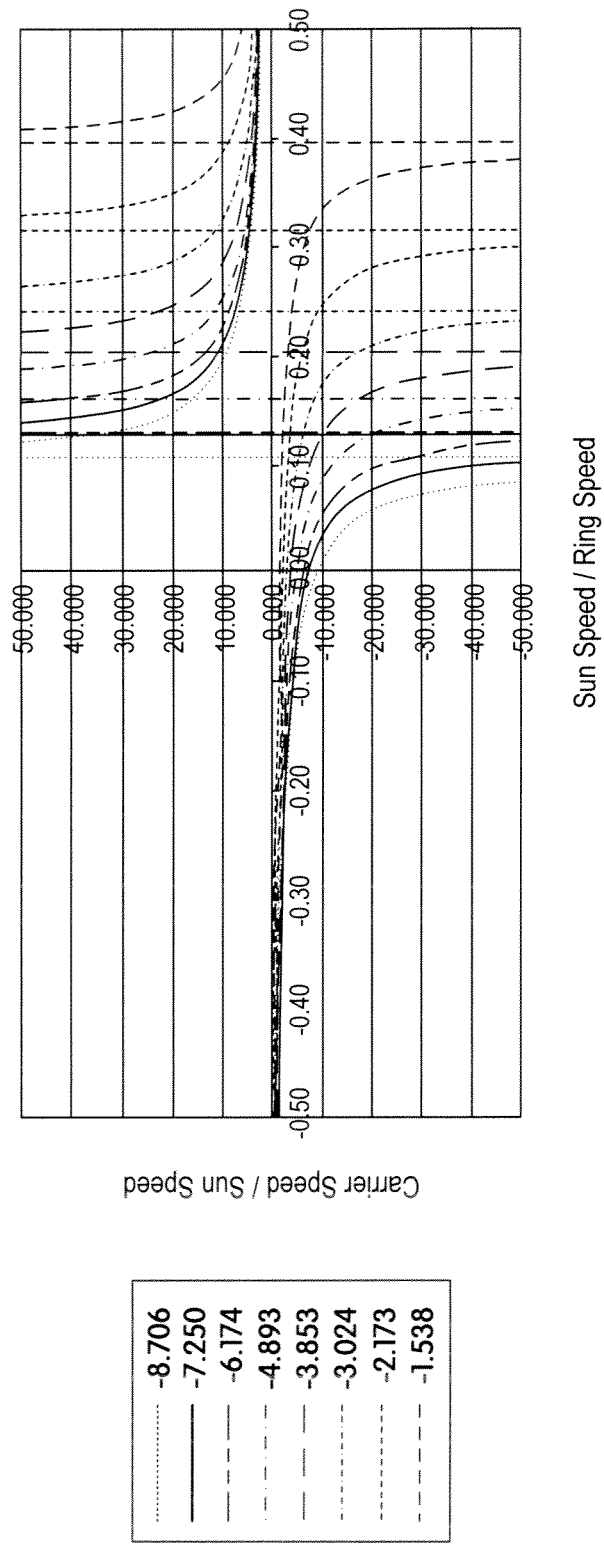
FIG. 18 is a graph depicting carrier speed to ring speed ratio versus sun speed to ring speed ratio for a number of fixed sun speed ratios of a simple star epicyclic gearset.

Note that the negative sign in front of the right hand side means the input and output shafts will rotate in opposite directions when the carrier speed is zero. FIG. 18 plots the speed ratio against $\omega_{C/S}$.

$$\tau_S - \tau_C = -\tau_R \quad (15)$$

$$\tau_S \cdot \omega_S - \tau_C \cdot \omega_C = \tau_R \cdot \omega_R \quad (16)$$

After substitute and rearranging terms of the above equations, the ring and carrier torques may be expressed in terms of the sun torque. The ring and carrier torques must be in a direction opposite to that of the sun. This has been addressed with the negative signs in the equation above.

$$\frac{\tau_R}{\tau_S} = \frac{-z_R}{z_S} \quad (17)$$

$$\frac{\tau_C}{\tau_S} = \frac{-(z_S + z_R)}{z_S} \quad (18)$$

The ratio of the reactive power to the input power as defined as κ. However, since the carrier and sun torques are in opposite directions, the same will be true of their powers. Therefore, when the carrier and sun speeds are in the same direction κ<0, and when the carrier and sun are in opposite directions, κ>0 and we have as was true for the planetary and solar arrangements:

$$u = \frac{-z_R}{z_S(1+\kappa)} = \frac{u_F}{(1+\kappa)} \quad (19)$$

Thus, in all three epicyclic arrangements, when it is desirable to have a greater speed reduction than the fixed reaction-member ratio, the device that powers the input member must also power the reaction device to provide this additional speed reduction ratio. Conversely, if it is desired to have a speed reduction ratio that is less than that of the fixed reaction-member ratio, the reaction device must power the reaction member to achieve this kinematic relationship. The reaction power will exit the gear drive through the output member, adding to the power output of the gear drive. FIG. 18 plots the ratio of carrier speed ($\omega_C$) to sun gear speed ($\omega_S$) against the ratio of sun gear speed ($\omega_S$) to ring gear speed ($\omega_R$) of the star epicyclic gearset at eight different fixed sun speed ratios ranging from -1.538 to -8.706 which are listed to the left of the plot, in the same manner that FIG. 3 plots the ratio of sun gear speed ($\omega_S$) to carrier speed ($\omega_C$) against the ratio of ring gear speed ($\omega_R$) to sun gear speed ($\omega_S$) for the simple planetary gearset at eight (8) different fixed ring ratios which are listed in Table 1 and to the left of the plot. The plot of FIG. 18 discloses that the vertical asymptote of the ratio of carrier speed ($\omega_C$) to sun gear speed ($\omega_S$) versus the ratio of sun gear speed ($\omega_S$) to ring gear speed ($\omega_R$) for the star epicyclic gearset ranges between about 0.00 and 0.50, in the same manner that FIG. 3 discloses that the vertical asymptote of the ratio of sun gear speed ($\omega_S$) to carrier speed ($\omega_C$) versus a ratio of ring gear speed ($\omega_R$) to sun gear speed ($\omega_S$) for the simple planetary gearset ranges between -0.650 and -0.115.

It should be appreciated that solar gear arrangement 120 and star gear arrangement 150 may be modified to function with compound planet gears as previously described in relation to FIG. 5. The offset drive and speed reduction units of FIGS. 7-14 may also be used with the solar and star simple or compound epicyclic gearset arrangements.

Figure 19:
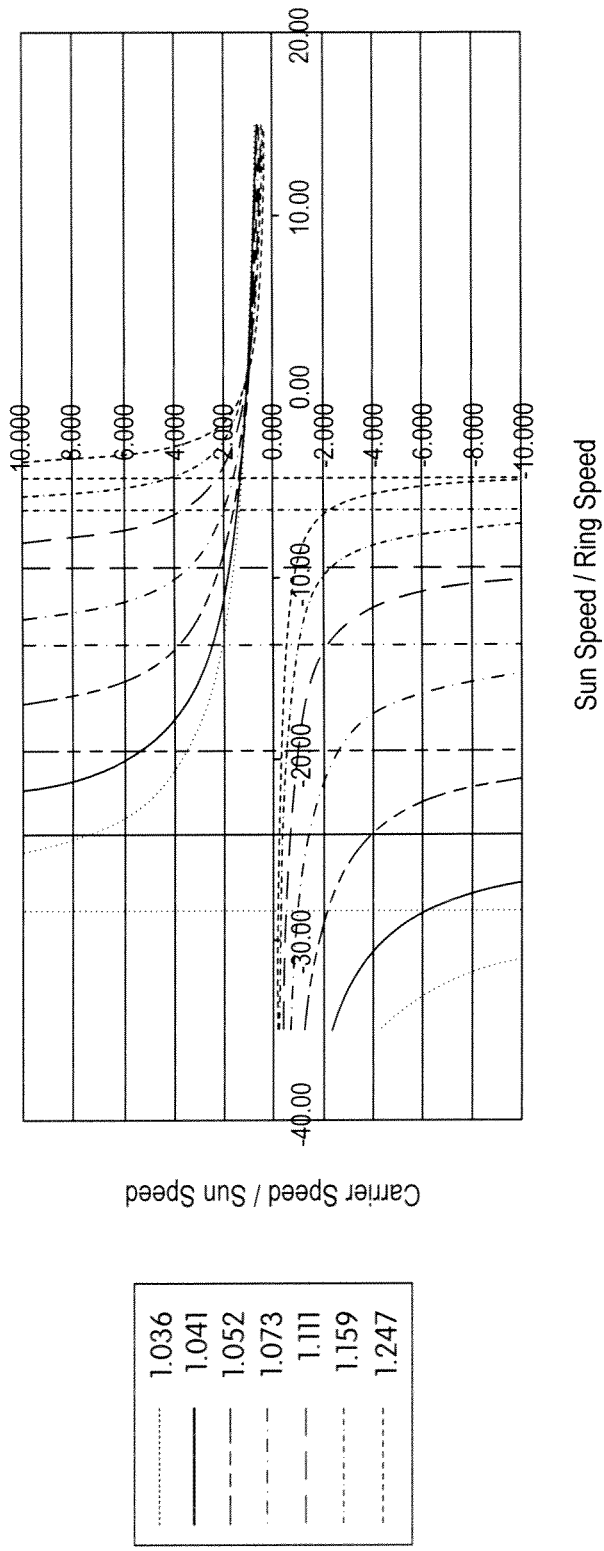
FIG. 19 is a graph depicting speed ratio sensitivity versus ring speed for a compound solar epicyclic gearset.
Figure 20:
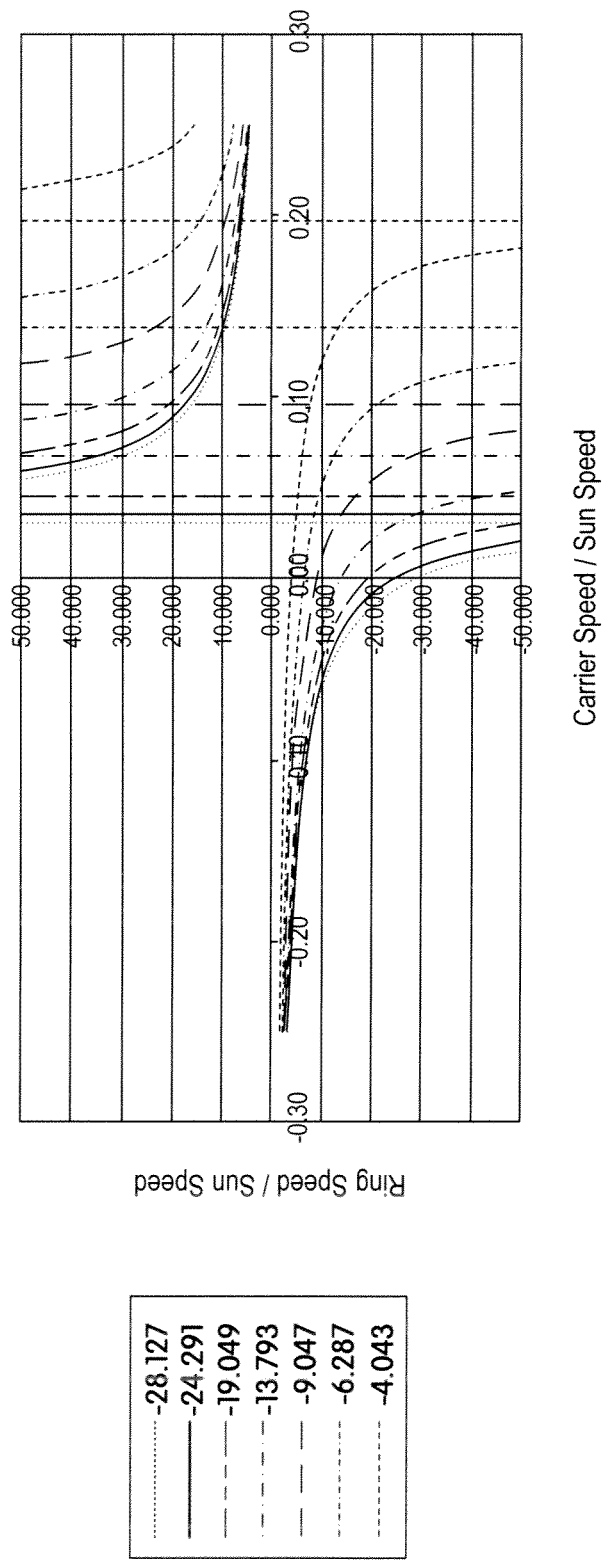
FIG. 20 is a graph depicting speed ratio sensitivity versus carrier speed for a compound star epicyclic gearset.

The kinematics relationships for the compound solar and star epicyclic arrangements are derived in a manner similar to that previously described. FIGS. 19 and 20 show the speed reduction ratios plotted against the ratio of the reaction member to input member speed for compound solar and star arrangements, respectively. It should be noted that the fixed ring speed ratios of the compound solar epicyclic gearsets range between 1.03 and 1.25. Furthermore, the vertical asymptote of a ratio of carrier speed to sun gear speed versus a ratio of sun gear speed to ring gear speed for the compound solar gearset ranges between 5 and 28.

Regarding FIG. 20 and the star epicyclic gearsets, the fixed carrier speed ratios of the compound star epicyclic gearsets range between -4.0 and -28.0. The vertical asymptote of a ratio of ring gear speed to sun gear speed versus a ratio of carrier speed to sun gear speed ranges for the compound solar gearsets between 0.02 and 0.20. The planetary, solar and star arrangement speed reduction ratios can be simplified using the reactive power quotients and, as with their simple epicyclic counterparts, can all be written as the fixed reaction member speed ratio divided by the quantity 1+κ.

Tables 3, 4 and 5 summarize the speed reduction ratios and planet speeds, torque and power for each epicyclic gear drive considered. Table 6 summarizes the speed reduction ratios using the reactive power quotients for each arrangement and Table 7 summarizes the asymptotic characteristics of where the asymptote occurs and what is the slope as the curve crosses the vertical axis.

TABLE 3

Speed Reduction Ratio and Planet Speeds

| | SPEED REDUCTION RATIO | PLANET SPEEDS |
|---|---|---|
| Simple Planetary | $\dfrac{\omega_S}{\omega_C} = \dfrac{z_R + z_S}{z_S + \omega_{R/S} \cdot z_R}$ | $\dfrac{\omega_P}{\omega_S} = \dfrac{(\omega_{R/S} \cdot z_R) - z_S}{2 \cdot z_P}$ |
| Compound Planetary | $\dfrac{\omega_S}{\omega_C} = \dfrac{z_R \cdot z_{PS} + z_S \cdot z_{PR}}{z_S \cdot z_{PR} + \omega_{R/S} \cdot z_R \cdot z_{PS}}$ | $\dfrac{\omega_P}{\omega_S} = \dfrac{(\omega_{R/S} \cdot z_R \cdot z_{PS}) - z_S \cdot z_{PR}}{2 \cdot z_{PR} \cdot z_{PS}}$ |
| Simple Solar | $\dfrac{\omega_R}{\omega_C} = \dfrac{z_R + z_S}{z_S + \omega_{S/R} \cdot z_S}$ | $\dfrac{\omega_P}{\omega_R} = \dfrac{z_R - (z_S \cdot \omega_{S/R})}{2 \cdot z_P}$ |

TABLE 3-continued

Speed Reduction Ratio and Planet Speeds

| | SPEED REDUCTION RATIO | PLANET SPEEDS |
|---|---|---|
| Compound Solar | $\dfrac{\omega_R}{\omega_C} = \dfrac{z_R \cdot z_{PS} + z_S \cdot z_{PR}}{z_R \cdot z_{PS} + \omega_{S/R} \cdot z_S \cdot z_{PR}}$ | $\dfrac{\omega_P}{\omega_R} = \dfrac{z_R \cdot z_{PS} - (\omega_{R/S} \cdot z_S \cdot z_{PR})}{2 \cdot z_{PR} \cdot z_{PS}}$ |
| Simple Star | $\dfrac{\omega_R}{\omega_S} = \dfrac{-z_R}{z_S - \omega_{C/S} \cdot (z_R + z_S)}$ | $\dfrac{\omega_P}{\omega_S} = \dfrac{[\omega_{C/S} \cdot (z_R + z_S)] - z_S}{2 \cdot z_P}$ |
| Compound Star | $\dfrac{\omega_R}{\omega_S} = \dfrac{-z_R \cdot z_{PS}}{z_S \cdot z_{PR} - \omega_{C/S} \cdot (z_R \cdot z_{PS} + z_S \cdot z_{PR})}$ | $\dfrac{\omega_P}{\omega_S} = \dfrac{[\omega_{C/S} \cdot (z_R \cdot z_{PS} + z_S \cdot z_{PR})] - z_S \cdot z_{PR}}{2 \cdot z_{PR} \cdot z_{PS}}$ |

TABLE 4

Torque Summary

| | SUN | RING | CARRIER |
|---|---|---|---|
| Simple Planetary | $\tau_S$ | $\dfrac{\tau_R}{\tau_S} = \dfrac{z_R}{z_S}$ | $\dfrac{\tau_C}{\tau_S} = \dfrac{z_R + z_S}{z_S}$ |
| Compound Planetary | $\tau_S$ | $\dfrac{\tau_R}{\tau_S} = \dfrac{z_R \cdot z_{PS}}{z_S \cdot z_{PR}}$ | $\dfrac{\tau_C}{\tau_S} = \dfrac{z_R \cdot z_{PS} + z_S \cdot z_{PR}}{z_S \cdot z_{PR}}$ |
| Simple Solar | $\dfrac{\tau_S}{\tau_R} = \dfrac{z_S}{z_R}$ | $\tau_R$ | $\dfrac{\tau_C}{\tau_R} = \dfrac{z_R + z_S}{z_R}$ |
| Compound Solar | $\dfrac{\tau_S}{\tau_R} = \dfrac{z_S \cdot z_{PR}}{z_R \cdot z_{PS}}$ | $\tau_R$ | $\dfrac{\tau_C}{\tau_R} = \dfrac{z_R \cdot z_{PS} + z_S \cdot z_{PR}}{z_R \cdot z_{PS}}$ |
| Simple Star | $\tau_S$ | $\dfrac{\tau_R}{\tau_S} = \dfrac{-z_R}{z_S}$ | $\dfrac{\tau_C}{\tau_S} = \dfrac{-(z_R + z_S)}{z_S}$ |
| Compound Star | $\tau_S$ | $\dfrac{\tau_R}{\tau_S} = \dfrac{-z_R \cdot z_{PS}}{z_S \cdot z_{PR}}$ | $\dfrac{\tau_C}{\tau_S} = \dfrac{-(z_R \cdot z_{PS} + z_S \cdot z_{PR})}{z_S \cdot z_{PR}}$ |

TABLE 6

Speed Reduction Ratios Using Reactive Power Quotients

| | | SIMPLE | COMPOUND |
|---|---|---|---|
| Planetary | | $\dfrac{\omega_S}{\omega_C} = \dfrac{z_R + z_S}{z_S \cdot \left(1 + \dfrac{\tau_R \cdot \omega_R}{\tau_S \cdot \omega_S}\right)}$ | $\dfrac{\omega_S}{\omega_C} = \dfrac{z_R \cdot z_{PS} + z_S \cdot z_{PR}}{z_S \cdot z_{PR} \cdot \left(1 + \dfrac{\tau_R \cdot \omega_R}{\tau_S \cdot \omega_S}\right)}$ |
| Solar | | $\dfrac{\omega_R}{\omega_C} = \dfrac{z_R + z_S}{z_R \cdot \left(1 + \dfrac{\tau_S \cdot \omega_S}{\tau_R \cdot \omega_R}\right)}$ | $\dfrac{\omega_R}{\omega_C} = \dfrac{z_R \cdot z_{PS} + z_S \cdot z_{PR}}{z_R \cdot z_{PS} \cdot \left(1 + \dfrac{\tau_S \cdot \omega_S}{\tau_R \cdot \omega_R}\right)}$ |
| Star | | $\dfrac{\omega_S}{\omega_R} = \dfrac{-z_R}{z_S \cdot \left(1 + \dfrac{\tau_C \cdot \omega_C}{\tau_S \cdot \omega_S}\right)}$ | $\dfrac{\omega_S}{\omega_R} = \dfrac{-z_R \cdot z_{PS}}{z_S \cdot z_{PR} \cdot \left(1 + \dfrac{\tau_C \cdot \omega_C}{\tau_S \cdot \omega_S}\right)}$ |

TABLE 5

Power Summary

| | SUN | RING | CARRIER |
|---|---|---|---|
| Simple Planetary | $\tau_S \cdot \omega_S$ | $\dfrac{\tau_R \cdot \omega_R}{\tau_S \cdot \omega_S} = \dfrac{z_R}{z_S} \cdot \omega_{R/S}$ | $\dfrac{\tau_C \cdot \omega_C}{\tau_S \cdot \omega_S} = \dfrac{z_S + \omega_{R/S} \cdot z_R}{z_S}$ |
| Compound Planetary | $\tau_S \cdot \omega_S$ | $\dfrac{\tau_R \cdot \omega_R}{\tau_S \cdot \omega_S} = \dfrac{z_R \cdot z_{PS}}{z_S \cdot z_{PR}} \cdot \omega_{R/S}$ | $\dfrac{\tau_C \cdot \omega_C}{\tau_S \cdot \omega_S} = \dfrac{z_S \cdot z_{PR} + \omega_{R/S} \cdot z_R \cdot z_{PS}}{z_S \cdot z_{PR}}$ |
| Simple Solar | $\dfrac{\tau_S \cdot \omega_S}{\tau_R \cdot \omega_R} = \dfrac{z_S}{z_R} \cdot \omega_{S/R}$ | $\tau_R \cdot \omega_R$ | $\dfrac{\tau_C \cdot \omega_C}{\tau_R \cdot \omega_R} = \dfrac{z_R + \omega_{S/R} \cdot z_S}{z_R}$ |
| Compound Solar | $\dfrac{\tau_S \cdot \omega_S}{\tau_R \cdot \omega_R} = \dfrac{z_S \cdot z_{PR}}{z_R \cdot z_{PS}} \cdot \omega_{S/R}$ | $\tau_R \cdot \omega_R$ | $\dfrac{\tau_C \cdot \omega_C}{\tau_R \cdot \omega_R} = \dfrac{z_R \cdot z_{PS} + \omega_{S/R} \cdot z_S \cdot z_{PR}}{z_R \cdot z_{PS}}$ |
| Simple Star | $\tau_S \cdot \omega_S$ | $\dfrac{\tau_R \cdot \omega_R}{\tau_S \cdot \omega_S} = \dfrac{z_S - \omega_{C/S} \cdot (z_R + z_S)}{z_S}$ | $\dfrac{\tau_C \cdot \omega_C}{\tau_S \cdot \omega_S} = \dfrac{-(z_R + z_S)}{z_S} \cdot \omega_{C/S}$ |
| Compound Star | $\tau_S \cdot \omega_S$ | $\dfrac{\tau_R \cdot \omega_R}{\tau_S \cdot \omega_S} = \dfrac{z_S \cdot z_{PR} - \omega_{C/S} \cdot (z_R \cdot z_{PS} + z_S \cdot z_{PR})}{z_S \cdot z_{PR}}$ | $\dfrac{\tau_C \cdot \omega_C}{\tau_S \cdot \omega_S} = \dfrac{-(z_R \cdot z_{PS} + z_S \cdot z_{PR})}{z_S \cdot z_{PR}} \cdot \omega_{C/S}$ |

TABLE 7

Vertical Asymptotes and Speed Reduction Ratio Slopes at Ordinate Axes

| | VERTICAL ASYMPTOTE | ORDINATE AXIS SLOPE |
|---|---|---|
| Simple Planetary | $\omega_{R/S} = \dfrac{-z_S}{z_R}$ | $\left\|\dfrac{du}{d\omega_{R/S}}\right\|_{\omega_{R/S}=0} = \dfrac{-z_R \cdot (z_R + z_S)}{z_S^2}$ |
| Compound Planetary | $\omega_{R/S} = \dfrac{-z_S \cdot z_{PR}}{z_R \cdot z_{PS}}$ | $\left\|\dfrac{du}{d\omega_{R/S}}\right\|_{\omega_{R/S}=0} = \dfrac{-z_R \cdot z_{PR} \cdot (z_R \cdot z_{PS} + z_S \cdot z_{PR})}{(z_S \cdot z_{PR})^2}$ |
| Simple Solar | $\omega_{S/R} = \dfrac{-z_R}{z_S}$ | $\left\|\dfrac{du}{d\omega_{S/R}}\right\|_{\omega_{S/R}=0} = \dfrac{-z_S \cdot (z_R + z_S)}{z_R^2}$ |
| Compound Solar | $\omega_{S/R} = \dfrac{-z_R \cdot z_{PS}}{z_S \cdot z_{PR}}$ | $\left\|\dfrac{du}{d\omega_{S/R}}\right\|_{\omega_{S/R}=0} = \dfrac{-z_S \cdot z_{PR} \cdot (z_R \cdot z_{PS} + z_S \cdot z_{PR})}{(z_R \cdot z_{PS})^2}$ |
| Simple Star | $\omega_{C/S} = \dfrac{z_S}{z_R + z_S}$ | $\left\|\dfrac{du}{d\omega_{C/S}}\right\|_{\omega_{C/S}=0} = \dfrac{-z_R \cdot (z_R + z_S)}{z_S^2}$ |
| Compound Star | $\omega_{C/S} = \dfrac{z_S \cdot z_{PR}}{z_R \cdot z_{PS} + z_S \cdot z_{PR}}$ | $\left\|\dfrac{du}{d\omega_{C/S}}\right\|_{\omega_{C/S}=0} = \dfrac{-z_R \cdot z_{PS} \cdot (z_R \cdot z_{PS} + z_S \cdot z_{PR})}{(z_S \cdot z_{PR})^2}$ |

It should be appreciated that all speed reduction ratios can be written in the form:

$$u = \frac{u_F}{1 + \kappa} \quad (20)$$

where $u_F$ is the fixed reaction member speed ratio specific to the particular epicyclic arrangement and $\kappa$ is the reactive power quotient. This is true regardless of whether the epicyclic arrangement is planetary, solar, star, simple or compound. The reactive power quotient can be a positive or negative quantity. When $\kappa < 0$, the speed reduction ratio will be larger than that of a gear drive with a fixed reaction member, and the input drive motor must supply power to both the output and the reaction motor/generator. When $\kappa > 0$, the speed reduction ratio will be smaller than that of a fixed reaction member gear drive, and the output will be powered by both the input drive motor and the reaction motor/generator.

Furthermore, the ratio spread, or the quotient between the maximum and minimum speed reduction ratios will determine the power requirements of the reaction motor/generator. If the primary drive motor is one with a narrow operating speed range and demands a large spread between the top and bottom speed ratios, the reactive power requirements will be large, possibly several times larger than that of the primary drive motor. If the primary drive motor has a wide operating speed range the reactive power requirements will be small. A ratio spread of 2.0 results in primary and reaction power requirements that are equal. The motor/generator size can be further reduced by mating it with its own fixed reaction member gear drive, using traditional methods to determine its required speed reduction ratio.

The selection of which type of epicyclic arrangement is optimum (i.e., planetary, solar or star) depends on the details and the required speed reduction ratio and ratio spread of the application. The slope of the speed reduction ratio at the ordinate axis of the star arrangement is equal to that of the planetary arrangement and the vertical asymptote of a star arrangement will always occur at a lower reaction member speed to that of a planetary arrangement.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A continuously variable transmission for a motor vehicle having a powertrain and a driveline driving a pair of wheels, the transmission comprising:
   a solar epicyclic gearset including a ring gear adapted to be driven by the powertrain, a sun gear, a carrier adapted to drive the driveline, and pinion gears rotatably supported by the carrier and which are meshed with the ring gear and the sun gear;
   a reaction motor driving the sun gear; and
   a controller for controlling the reaction motor to vary the speed of the sun gear and define a gear ratio between the ring gear and the carrier based on the sun gear speed, wherein a vertical asymptote of a ratio of ring gear speed to carrier speed versus a ratio of sun gear speed to ring gear speed for the solar epicyclic gearset ranges between about −1 and −10.

2. The continuously variable transmission of claim 1 wherein a fixed sun speed ratio of the solar epicyclic gearset ranges between 1.115 and 1.650.

3. The continuously variable transmission of claim 1 further comprising:
   a first input shaft coupling the powertrain to the ring gear;
   a second input shaft coupling the reaction motor to the sun gear; and
   an output shaft coupling the carrier to the driveline.

4. The continuously variable transmission of claim 3 wherein a neutral mode is established when the output shaft is not rotating while the first and second input shafts are rotating.

5. The continuously variable transmission of claim 3 wherein the output shaft is concentrically arranged with the second input shaft.

6. The continuously variable transmission of claim 3 wherein the second input shaft extends coaxially with the first input shaft.

7. The continuously variable transmission of claim 3 further including a reduction gearset driven by the second input shaft and driving the sun gear.

8. The continuously variable transmission of claim 7 wherein the reduction gearset includes a worm gear fixed for rotation with the second input shaft and a worm wheel driving the sun gear.

9. The continuously variable transmission of claim 7 wherein the reduction gearset includes a planetary gearset having an input driven by the second input shaft and an output driving the sun gear.

10. A continuously variable transmission for a motor vehicle having a powertrain and a driveline driving a pair of wheels, the transmission comprising:
    a star epicyclic gearset including a sun gear adapted to be driven by the powertrain, a ring gear adapted to drive the driveline, a carrier, and planet gears rotatably supported by the carrier and which are meshed with the sun gear and the ring gear;
    a reaction motor driving the carrier; and
    a controller for controlling the reaction motor to vary the speed of the carrier and define a gear ratio between the sun gear and the ring gear based on the carrier speed, wherein a vertical asymptote of a ratio of carrier speed to sun gear speed versus a ratio of sun gear speed to ring gear speed for the star epicyclic gearset ranges between 10.00 and 0.50.

11. The continuously variable transmission of claim 10 wherein a fixed sun speed ratio of the star epicyclic gearset ranges between −1.538 and −8.706.

12. The continuously variable transmission of claim 10 further comprising:
    a first input shaft coupling the powertrain to the sun gear;
    a second input shaft coupling the reaction motor to the carrier; and
    an output shaft coupling the ring gear to the driveline.

13. The continuously variable transmission of claim 12 wherein a neutral mode is established when the output shaft is not rotating while the first and second input shafts are rotating.

14. The continuously variable transmission of claim 12 wherein the output shaft is concentrically arranged with the second input shaft.

15. The continuously variable transmission of claim 12 wherein the second input shaft extends coaxially with the first input shaft.

16. The continuously variable transmission of claim 12 further including a reduction gearset driven by the second input shaft and driving the carrier.

17. The continuously variable transmission of claim 12 wherein the first input shaft is rotated in an opposite direction to the output shaft.

18. A continuously variable transmission for use in a motor vehicle having a powertrain and a driveline driving a set of wheels, the transmission comprising:
    a first input shaft driven by the powertrain;
    a second input shaft;
    an output shaft driving the driveline;
    a reaction motor driving the second input shaft; and
    a solar epicyclic gearset having a ring gear driven by the first input shaft, a sun gear driven by the second input shaft, a carrier driving the output shaft, and planet gears rotatably supported by the carrier and which are meshed with the ring gear and the sun gear;
    wherein the reaction motor is operable to vary the speed of the second input shaft to establish a gear ratio between the first input shaft and the output shaft based on the speed of the second input shaft, and wherein a fixed sun speed ratio for the solar epicyclic gearset ranges between 1.115 and 1.650.

19. The continuously variable transmission of claim 18 wherein a vertical asymptote of a ratio of ring gear speed to carrier speed versus a ratio of sun gear speed to ring gear speed for the solar epicyclic gearset ranges between −1 and −10.

20. A continuously variable transmission for use in a motor vehicle having a powertrain and a driveline driving a set of wheels, the transmission comprising:
    a first input shaft driven by the powertrain;
    a second input shaft;
    a reaction motor driving the second input shaft;
    an output shaft driving the driveline; and
    a star epicyclic gearset having a sun gear coupled to the first input shaft, a ring gear coupled to the output shaft, a carrier coupled to the second input shaft, and planet gears rotatably supported by the carrier and which are meshed with the sun gear and the ring gear;
    wherein the reaction motor is operable to vary the speed of the carrier and define a speed ratio between the first input shaft and the output shaft based on the carrier speed, and wherein a fixed sun speed ratio of the star epicyclic gearset ranges between −1.538 and −8.706.

21. The continuously variable transmission of claim 20 wherein a vertical asymptote of a ratio of carrier speed to sun gear speed versus a ratio of sun gear speed to ring gear speed for the star epicyclic gearset ranges between 0.00 and 0.50.

22. A continuously variable transmission for a motor vehicle having a powertrain and a driveline driving a pair of wheels, the transmission comprising:
    a gearset including a sun gear adapted to be driven by the powertrain, a ring gear, a carrier adapted to drive the driveline, and planet gears rotatably supported by the carrier and which are meshed with the sun gear and the ring gear;
    a reaction motor driving the ring gear; and
    a controller for controlling the reaction motor to vary the speed of the ring gear and define a gear ratio between the sun gear and the carrier based on the ring gear speed, wherein a vertical asymptote of a ratio of sun gear speed to carrier speed versus a ratio of ring gear speed to sun gear speed ranges between −0.115 and −0.650.

23. The continuously variable transmission of claim 22 further including a reduction gearset having an input driven by the reaction motor and an output driving the ring gear.

24. The continuously variable transmission of claim 22 wherein the reduction gearset includes a planetary reduction gearset having a second sun gear driven by the reaction motor, a second ring gear fixed against rotation, a second carrier driving the ring gear, and second planet gears rotatably supported by the second carrier and meshed with the second sun gear and the second ring gear.

* * * * *